United States Patent
Ramesh et al.

(10) Patent No.: US 10,907,079 B2
(45) Date of Patent: Feb. 2, 2021

(54) PROCESS FOR PREPARATION OF HOMOGENEOUS MIXTURE FOR THERMAL STORAGE AND HEAT TRANSFER APPLICATIONS

(71) Applicant: HINDUSTAN PETROLEUM CORPORATION LTD., Mumbai (IN)

(72) Inventors: Kanaparthi Ramesh, Bangalore (IN); Kandoth Madathil Pramod, Bangalore (IN); Peddy Venkat Chalapathi Rao, Bangalore (IN); Nettem Venkateswarlu Choudary, Bangalore (IN)

(73) Assignee: HINDUSTAN PETROLEUM CORPORATION LTD., Mumbai (IN)

( * ) Notice: Subject to any disclaimer, the term of this patent is extended or adjusted under 35 U.S.C. 154(b) by 0 days.

(21) Appl. No.: 15/511,485

(22) PCT Filed: May 24, 2016

(86) PCT No.: PCT/IN2016/050154
§ 371 (c)(1),
(2) Date: Mar. 15, 2017

(87) PCT Pub. No.: WO2016/189550
PCT Pub. Date: Dec. 1, 2016

(65) Prior Publication Data
US 2017/0283674 A1  Oct. 5, 2017

(30) Foreign Application Priority Data
May 25, 2015  (IN) .......................... 2032/MUM/2015

(51) Int. Cl.
C09K 5/04      (2006.01)
C09K 5/06      (2006.01)
F24S 80/20     (2018.01)
C01B 21/48     (2006.01)
C09K 5/12      (2006.01)

(52) U.S. Cl.
CPC .............. *C09K 5/063* (2013.01); *C01B 21/48* (2013.01); *C09K 5/12* (2013.01); *F24S 80/20* (2018.05); *Y02E 10/40* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,490,966 A | * | 1/1970 | Hiltz | C06B 33/04 149/17 |
| 7,588,694 B1 | * | 9/2009 | Bradshaw | C01B 21/48 252/71 |
| 7,828,990 B1 | | 11/2010 | Cordaro et al. | |
| 2010/0038581 A1 | | 2/2010 | Gladen et al. | |
| 2014/0084205 A1 | | 3/2014 | Singh et al. | |
| 2015/0376487 A1 | * | 12/2015 | Zeng | C09K 5/12 252/71 |
| 2017/0283676 A1 | | 10/2017 | Pramod et al. | |

FOREIGN PATENT DOCUMENTS

| | | | |
|---|---|---|---|
| CN | 00111406.9 | * | 3/2004 |
| CN | 1142235 C | | 3/2004 |
| CN | 102433104 A | | 5/2012 |
| CN | 103289653 A | | 9/2013 |
| CN | 102 433 104 B | | 6/2014 |
| DE | 10 2011 083 735 A1 | | 4/2013 |
| DE | 102011083735 A1 | | 4/2013 |
| DE | 10 2012 211 917 A1 | | 1/2014 |
| DE | 102012211917 A1 | | 1/2014 |
| WO | 2012/107834 A1 | | 8/2012 |
| WO | WO2010/107834 | * | 8/2012 |
| WO | 2016/203498 A1 | | 12/2016 |

OTHER PUBLICATIONS

International journal of heat and mass transfer, 74, (2014, 210-214: Shin et al.: specific heat of nanofluids synthesized by dispersing alumina nanoparticles in alkali salt eutectic (Year: 2004).*
Synthesis of amorphous MoS2 nanosphere by hydrothermal reaction, Tian et al., Material Letters 60, (2006) 527-529.*
Shin et al., "Specific Heat of Nanofluids Synthesized by Dispersing Alumina Nanoparticles in Alkali Salt Eutectic," *International Journal of Heat and Mass Transfer* 74:210-214, 2014.
International Search Report, dated Sep. 12, 2016, for PCT/IN2016/050154, 3 pages.
Written Opinion, dated Sep. 12, 2016, for PCT/IN2016/050154, 6 pages.
International Search Report, dated Sep. 23, 2016, for PCT/IN2016/050188, 4 pages.
Written Opinion, dated Sep. 23, 2016, for PCT/IN2016/050188, 6 pages.
R. Etefagh et al., "Synthesis of CuO nanoparticles and fabrication of nanostructural layer biosensors for detecting Aspergillus niger fungi," *Scientia Iranica, Transactions F: Nanotechnology* (2013) 20 (3), 1055-1058.
Yumei Tian et al., "Synthesis of amorphous $MoS_2$ nanospheres by hydrothermal reaction," *Materials Letters* 60 (2006), 527-529.
Fazel Yavari et al., "Enhanced Thermal Conductivity in a Nanostructured Phase Change Composite due to Low Concentration Graphene Additives," *J. Phys. Chem. C* 2011, 115, 8753-8758.

* cited by examiner

*Primary Examiner* — Monique R Peets
(74) *Attorney, Agent, or Firm* — Seed Intellectual Property Law Group LLP

(57) ABSTRACT

In accordance with the present subject matter there is provided a hygroscopic homogeneous salt mixture including at least one alkali metal salt and a metal salt having water of crystallization. The subject matter also relates to a method for preparation of hygroscopic homogeneous salt mixture.

17 Claims, 5 Drawing Sheets

US 10,907,079 B2

PROCESS FOR PREPARATION OF HOMOGENEOUS MIXTURE FOR THERMAL STORAGE AND HEAT TRANSFER APPLICATIONS

TECHNICAL FIELD

The subject matter described herein in general relates to a hygroscopic homogeneous salt mixture including at least one alkali metal salt and a metal salt having water of crystallization. The subject matter also relates to a method for preparation of hygroscopic homogeneous salt mixture. The hygroscopic homogeneous salt mixture can be used in concentrated solar power (CSP) plant as solar thermal energy storage materials as well as heat transfer fluids.

BACKGROUND

Human-related greenhouse gases emission is one of the reasons for global warming. Increased consumption of energy from conventional fossil fuels in the last decades has led to the release of greenhouse gases which could adversely affect the climate. To reduce the impact of climate change due to global warming, special attention is required to implement advanced technologies for the production of clean and safe renewable energy, particularly solar energy.

Solar energy is an important alternative energy source to fossil fuels and the most available energy source on the earth. Solar thermal energy storage is a key element for the improvisation of the efficiency of thermal energy utilization because large scale solar energy production demands a wider storage capacity. Different types of energy forms such as mechanical, chemical, electrical and thermal energy can be stored using appropriate methods. High temperature thermal energy storage systems can deal with a wide range of temperatures and concentrated solar power applications and have greater potential in terms of technology as well as economy. The solar thermal energy can be stored in the molten salt media from where the heat energy is transferred to water for thermal operations such as high-power steam generation in solar power plants.

U.S. Pat. No. 7,828,990 discloses a low-melting molten salt composition containing five inorganic salts including $LiNO_3$, $NaNO_3$, $KNO_3$, $NaNO_2$ and $KNO_2$ and also the same patent discloses the synthesis of quaternary salts containing $NaNO_3$, $KNO_3$, $LiNO_3$ and $Ca(NO_3)_2.4H_2O$. The salts were taken in an open aluminium crucible and the salt mixtures were heated at 350 to 400° C. for at least one overnight. The energy consumption for the synthetic procedure is quite high because of very high temperatures and time.

US 20100038581 describes a synthetic procedure of ternary molten salt mixtures $KNO_2$, $NaNO_2$ and $LiNO_3$ which can be applied for thermal energy storage.

WO 2012093012 discloses a novel heat storage system based on nitrate salts containing Ba and/or Sr to Li—Na—K—$NO_3$ mixture.

WO 2012107834 describes the synthesis of molten salt based on nitrates of Li, Na, K and Cs wherein, $LiNO_3$ content ranges from 17.5% by weight to 21.6% by weight, the $NaNO_3$ content ranges from 10% by weight to 11% by weight, the $KNO_3$ content ranges from 27.7% by weight to 32.6% by weight, the $CsNO_3$ content ranges from 35.8% by weight to 43.8% by weight.

U.S. Pat. No. 7,588,694 discloses anhydrous compositions belonging to the quaternary $LiNO_3$—$NaNO_3$—$KNO_3$—$Ca(NO_3)_2$ system, said compositions having a melting temperature below 95° C. and a high thermal stability up to the temperature of 500° C.

Normally solar thermal power plants make use of molten salt materials consisting of a binary nitrate salt mixture known as 'solar salt' which are composed of 60% $NaNO_3$ and 40% $KNO_3$ and ternary nitrate/nitrite mixture of 53% $KNO_3$, 7% $NaNO_3$ and 40% $NaNO_2$, generally known as HITEC salt. U.S. Pat. No. 7,588,694 discloses a low-melting point, heat transfer fluid made of a mixture of four inorganic nitrate salts: 9-18 wt % $NaNO_3$, 40-52 wt % $KNO_3$, 13-21 wt % $LiNO_3$, and 20-27 wt % $Ca(NO_3)_2$. These compositions can have liquidus temperatures less than 100° C.; thermal stability limits greater than 500° C.; and viscosity in the range of 5-6 cP at 300° C.; and 2-3 cP at 400° C.

CN 00111406.9 discloses a molten salt mixture comprising of $LiNO_3$, $KNO_3$, $NaNO_3$, and $NaNO_2$ and the method of preparation. CN 200710027954.1 discloses a method for preparing molten salt heat-transfer and heat-storage medium, which comprises potassium nitrate, sodium nitrate, sodium nitrite and additives. The additives are cesium nitrate and potassium chloride at a weight ratio of (0.1-0.8):1. The molten salt heat-transfer and heat-storage medium has such advantages as good heat transfer property, wide working temperature range, high heat stability, high upper limit of safe usage temperature, low melting point, high phase-change latent heat, low requirement for system size and energy, and high energy utility. CN 201110287684.4 discloses a heat transfer fluid, including 50~80% $KNO_3$; 0~25% $LiNO_3$; and 10~45% $Ca(NO_3)_2$ and method of preparation of said heat transfer fluid.

SUMMARY

The present disclosure relates to a method for preparation of hygroscopic homogeneous salt mixture, the method comprising the steps of: (a) contacting at least one alkali metal salt with a metal salt having water of crystallization to form a heterogeneous mixture; (b) subjecting said heterogeneous mixture to a temperature of 140 to 180° C. in a closed system to obtain a homogeneous mixture; and (c) removing water from the homogeneous mixture to obtain a hygroscopic homogeneous salt mixture. The present disclosure relates to a hygroscopic homogeneous salt mixture comprising: (a) at least one alkali metal salt; and (b) a metal salt having water of crystallization, wherein the hygroscopic homogeneous salt mixture has a melting temperature in the range of 100 to 150° C.

These and other features, aspects and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
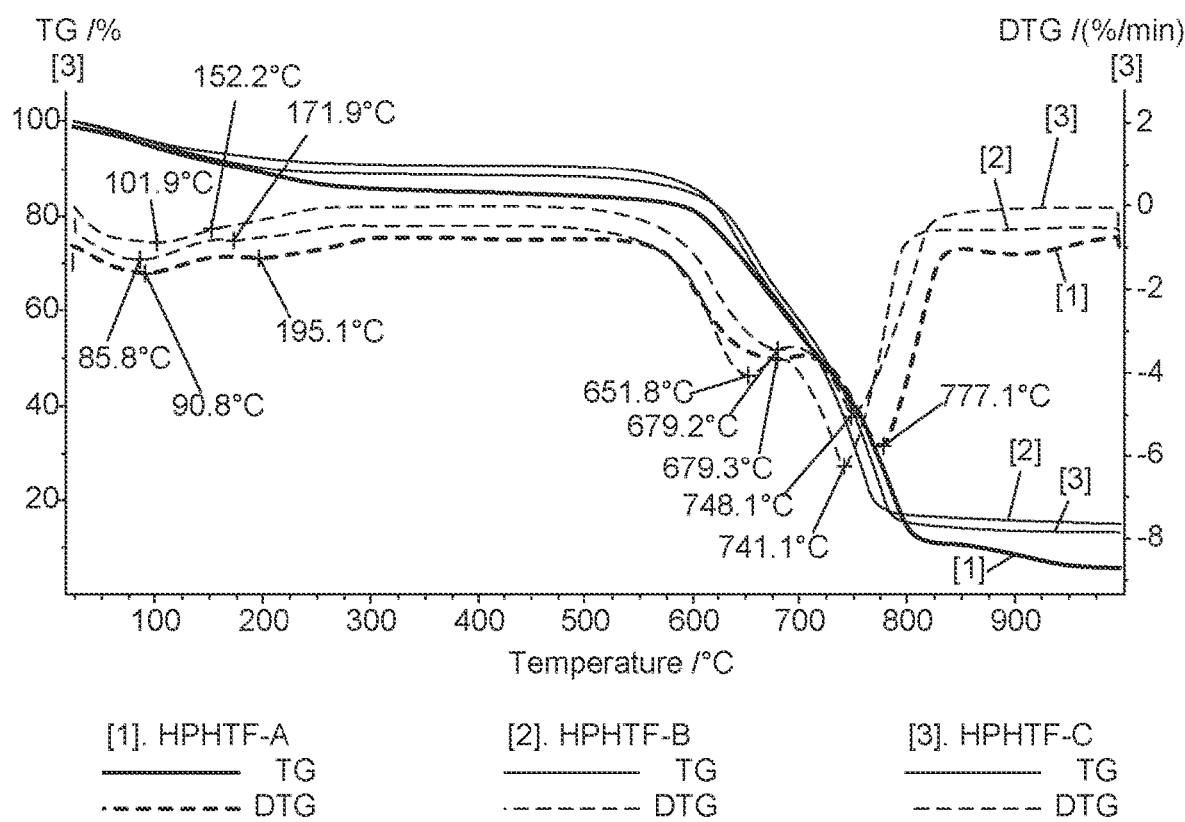
FIG. 1 illustrates TGA-DTG of HPHTF-A, HPHTF-B and HPHTF-C.

Those skilled in the art will be aware that the present disclosure is subject to variations and modifications other than those specifically described. It is to be understood that the present disclosure includes all such variations and modifications. The disclosure also includes all such steps, features, compositions and compounds referred to or indicated in this specification, individually or collectively and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. Throughout this specification, unless the context requires otherwise the word "comprise", and variations, such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

The term "water of crystallization" or "water of hydration" refers to water that occurs inside the crystals.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature range of about 140° C. to about 180° C. should be interpreted to include not only the explicitly recited limits of about 140° C. to about 180° C., but also to include sub-ranges, such as 145° C. to 155° C., 150° C. to 170° C., and so forth, as well as individual amounts, including fractional amounts, within the specified ranges, such as 142.2° C., 140.6° C., and 141.3° C., for example.

The present disclosure provides a cost-effective preparation method of molten salt compositions for thermal energy storage such as solar thermal applications that can be used in concentrated solar power (CSP) plant as solar thermal energy storage materials as well as heat transfer fluids. For solar thermal energy storage materials, the important materials requirements are high energy density, high heat transfer efficiency, good thermal stability, good cycle stability, non-corrosive behaviour, non-toxic, availability and cost-effectiveness. The present disclosure relates to a method for preparation of hygroscopic homogeneous salt mixture, the method comprising the steps of: (a) contacting at least one alkali metal salt with a metal salt having water of crystallization to form a heterogeneous mixture; (b) subjecting said heterogeneous mixture to a temperature of 140 to 180° C. in a closed system to obtain a homogeneous mixture; and (c) removing water from the homogeneous mixture to obtain a hygroscopic homogeneous salt mixture. The process for preparation of hygroscopic homogeneous salt mixture is cost effective. The molten salt are homogenized which saves lot of energy. Further, the low-melting molten salt mixtures should be stable at high temperature and can be efficiently utilized in a solar thermal energy storage and electric power generation system.

The hygroscopic homogeneous salt mixture of the present disclosure have melting point less than 150° C. and thermal stability above 500° C. without compromising the thermophysical properties like thermal conductivity, specific heat capacity and flow properties in molten state. The present disclosure relates to a hygroscopic homogeneous salt mixture comprising: (a) at least one alkali metal salt; and (b) a metal salt having water of crystallization, wherein the hygroscopic homogeneous salt mixture has a melting temperature in the range of 100 to 150° C.

In one implementation, the hygroscopic homogeneous salt mixture includes: (a) at least one alkali metal salt; and (b) a metal salt having water of crystallization selected from the group consisting of $Ca(NO_3)_2.4H_2O$, $Na_2S_2O_3.5H_2O$, $Al(NO_3)_3.9H_2O$, $Fe(NO_3)_3.9H_2O$, $Ni(NO_3)_2.6H_2O$, and $Co(NO_3)_2.6H_2O$, wherein the hygroscopic homogeneous salt mixture has a melting temperature in the range of 100 to 150° C.

In one implementation, the hygroscopic homogeneous salt mixture includes: (a) at least one alkali metal salt selected from the group consisting of lithium salt of inorganic anions, sodium salt of inorganic anions, potassium salt of inorganic anions, and combinations thereof; and (b) a metal salt having water of crystallization, wherein the hygroscopic homogeneous salt mixture has a melting temperature in the range of 100 to 150° C.

In another implementation, the hygroscopic homogeneous salt mixture includes: (a) at least one alkali metal salt selected from the group consisting of lithium metal salt, potassium metal salt, and combinations thereof; and (b) a metal salt having water of crystallization, wherein the hygroscopic homogeneous salt mixture has a melting temperature in the range of 100 to 150° C.

In yet another implementation, the hygroscopic homogeneous salt mixture includes: (a) at least one alkali metal salt is a combination of lithium and potassium nitrate; and (b) a metal salt having water of crystallization, wherein the hygroscopic homogeneous salt mixture has a melting temperature in the range of 100 to 150° C.

In yet another implementation, the hygroscopic homogeneous salt mixture includes: (a) at least one alkali metal salt is a combination of 60 to 70 wt % potassium nitrate and 5 to 20 wt % lithium nitrate; and (b) a metal salt having water of crystallization, wherein the hygroscopic homogeneous salt mixture has a melting temperature in the range of 100 to 150° C.

In yet another implementation, the hygroscopic homogeneous salt mixture includes: (a) at least one alkali metal salt; and (b) a metal salt having water of crystallization selected from the group consisting of alkali metal salt, alkaline earth metal salt, and transitional metal salt, wherein the hygroscopic homogeneous salt mixture has a melting temperature in the range of 100 to 150° C.

In yet another implementation, the hygroscopic homogeneous salt mixture includes: (a) at least one alkali metal salt is a combination of 60 to 70 wt % potassium nitrate and 5 to 20 wt % lithium nitrate; and (b) a metal salt having water of crystallization selected from the group consisting of alkali metal salt, alkaline earth metal salt, and transitional metal salt, wherein the hygroscopic homogeneous salt mixture has a melting temperature in the range of 100 to 150° C.

In yet another implementation, the hygroscopic homogeneous salt mixture includes: (a) at least one alkali metal salt is a combination of 60 to 70 wt % potassium nitrate and 5 to 20 wt % lithium nitrate; and (b) 10 to 35 wt % of a metal salt having water of crystallization selected from the group consisting of alkali metal salt, alkaline earth metal salt, and transitional metal salt, wherein the hygroscopic homogeneous salt mixture has a melting temperature in the range of 100 to 150° C.

The hygroscopic homogeneous salt mixture or molten salt compositions display lower melting temperatures compared to commercially available HITEC ternary salts and can be used as heat storage as well as heat transfer fluids for solar thermal energy systems. In one implementation, the molten salt mixtures include potassium nitrate, lithium nitrate and one hydrated metal salt. Among the three salt candidates, potassium nitrate exhibits the highest melting point of 334° C. The lithium nitrate and hydrated salt helps to depress the melting point of potassium nitrate. The hygroscopic homogeneous salt mixtures are stable even at 560° C. and are relatively inexpensive compared to organic heat transfer fluids, thus making them amenable for use in large-scale thermal energy storage systems.

As described above, the present disclosure relates to a method for preparation of hygroscopic homogeneous salt mixture. In one implementation, the method for preparation of hygroscopic homogeneous salt mixture includes the steps of: (a) contacting at least one alkali metal salt selected from the group consisting of lithium metal salt, potassium metal salt, and combinations thereof with a metal salt having water of crystallization to form a heterogeneous mixture; (b) subjecting said heterogeneous mixture to a temperature of 140 to 180° C. in a closed system to obtain a homogeneous mixture; and (c) removing water from the homogeneous mixture to obtain a hygroscopic homogeneous salt mixture.

In one implementation, the method for preparation of hygroscopic homogeneous salt mixture includes the steps of: (a) contacting at least one alkali metal salt selected from the group consisting of lithium salt of inorganic anions, sodium salt of inorganic anions, potassium salt of inorganic anions, and combinations thereof with a metal salt having water of crystallization to form a heterogeneous mixture; (b) subjecting said heterogeneous mixture to a temperature of 140 to 180° C. in a closed system to obtain a homogeneous mixture; and (c) removing water from the homogeneous mixture to obtain a hygroscopic homogeneous salt mixture.

In one implementation, the method for preparation of hygroscopic homogeneous salt mixture includes the steps of: (a) contacting at least one alkali metal salt with a metal salt having water of crystallization to form a heterogeneous mixture, wherein the at least one alkali metal salt weight ratio in the heterogeneous mixture is in the range of 65 to 90%; (b) subjecting said heterogeneous mixture to a temperature of 140 to 180° C. in a closed system to obtain a homogeneous mixture; and (c) removing water from the homogeneous mixture to obtain a hygroscopic homogeneous salt mixture.

In one implementation, the method for preparation of hygroscopic homogeneous salt mixture includes the steps of: (a) contacting at least one alkali metal salt with a metal salt having water of crystallization to form a heterogeneous mixture, wherein the at least one alkali metal salt is a combination of lithium and potassium nitrate; (b) subjecting said heterogeneous mixture to a temperature of 140 to 180° C. in a closed system to obtain a homogeneous mixture; and (c) removing water from the homogeneous mixture to obtain a hygroscopic homogeneous salt mixture.

In one implementation, the method for preparation of hygroscopic homogeneous salt mixture includes the steps of: (a) contacting at least one alkali metal salt with a metal salt having water of crystallization to form a heterogeneous mixture, wherein the at least one alkali metal salt is a combination of lithium and potassium nitrate, wherein potassium nitrate weight ratio in the heterogeneous mixture is in the range of 60 to 70% and lithium nitrate weight ratio in the heterogeneous mixture is in the range of 5 to 20%; (b) subjecting said heterogeneous mixture to a temperature of 140 to 180° C. in a closed system to obtain a homogeneous mixture; and (c) removing water from the homogeneous mixture to obtain a hygroscopic homogeneous salt mixture.

In one implementation, the method for preparation of hygroscopic homogeneous salt mixture includes the steps of: (a) contacting at least one alkali metal salt with a metal salt having water of crystallization to form a heterogeneous mixture, wherein the at least one alkali metal salt is dried at a temperature in the range of 80 to 120° C. under reduced pressure before carrying out step (a); (b) subjecting said heterogeneous mixture to a temperature of 140 to 180° C. in a closed system to obtain a homogeneous mixture; and (c) removing water from the homogeneous mixture to obtain a hygroscopic homogeneous salt mixture.

In one implementation, the method for preparation of hygroscopic homogeneous salt mixture includes the steps of: (a) contacting at least one alkali metal salt with a metal salt having water of crystallization selected from the group consisting of alkali metal salt, alkaline earth metal salt, and transitional metal salt to form a heterogeneous mixture; (b) subjecting said heterogeneous mixture to a temperature of 140 to 180° C. in a closed system to obtain a homogeneous mixture; and (c) removing water from the homogeneous mixture to obtain a hygroscopic homogeneous salt mixture.

In one implementation, the method for preparation of hygroscopic homogeneous salt mixture includes the steps of: (a) contacting at least one alkali metal salt with a metal salt having water of crystallization and melting point in the range 40 to 120° C. to form a heterogeneous mixture; (b) subjecting said heterogeneous mixture to a temperature of 140 to 180° C. in a closed system to obtain a homogeneous mixture; and (c) removing water from the homogeneous mixture to obtain a hygroscopic homogeneous salt mixture.

In one implementation, the method for preparation of hygroscopic homogeneous salt mixture includes the steps of: (a) contacting at least one alkali metal salt with a metal salt having water of crystallization and melting point in the range 40 to 80° C. to form a heterogeneous mixture; (b) subjecting said heterogeneous mixture to a temperature of 140 to 180° C. in a closed system to obtain a homogeneous mixture; and (c) removing water from the homogeneous mixture to obtain a hygroscopic homogeneous salt mixture.

In one implementation, the method for preparation of hygroscopic homogeneous salt mixture includes the steps of: (a) contacting at least one alkali metal salt with a metal salt having water of crystallization to form a heterogeneous mixture, wherein the metal salt having water of crystallization weight ratio in the heterogeneous mixture is in the range of 10 to 35%; (b) subjecting said heterogeneous mixture to a temperature of 140 to 180° C. in a closed system to obtain a homogeneous mixture; and (c) removing water from the homogeneous mixture to obtain a hygroscopic homogeneous salt mixture.

In one implementation, the method for preparation of hygroscopic homogeneous salt mixture includes the steps of: (a) contacting at least one alkali metal salt with a metal salt having water of crystallization to form a heterogeneous mixture, wherein the heterogeneous mixture has moisture content in the range 3 to 13 wt %; (b) subjecting said heterogeneous mixture to a temperature of 140 to 180° C. in a closed system to obtain a homogeneous mixture; (c) removing water from the homogeneous mixture to obtain a hygroscopic homogeneous salt mixture.

In one implementation, the method for preparation of hygroscopic homogeneous salt mixture includes the steps of: (a) contacting at least one alkali metal salt with a metal salt having water of crystallization to form a heterogeneous mixture; (b) subjecting said heterogeneous mixture to a temperature of 140 to 180° C. for 0.5 to 1.5 h in a closed system to obtain a homogeneous mixture; and (c) removing water from the homogeneous mixture to obtain a hygroscopic homogeneous salt mixture.

In one implementation, the method for preparation of hygroscopic homogeneous salt mixture includes the steps of: (a) contacting at least one alkali metal salt with a metal salt having water of crystallization to form a heterogeneous mixture; (b) subjecting said heterogeneous mixture to a temperature of 140 to 180° C. in a closed system at a pressure in the range of 1.3 to 3 bars to obtain a homogeneous mixture; and (c) removing water from the homogeneous mixture to obtain a hygroscopic homogeneous salt mixture.

In one implementation, the method for preparation of hygroscopic homogeneous salt mixture includes the steps of: (a) contacting at least one alkali metal salt with a metal salt having water of crystallization to form a heterogeneous mixture; (b) subjecting said heterogeneous mixture to a temperature of 140 to 180° C. in a closed system to obtain a homogeneous mixture; and (c) removing water from the homogeneous mixture to obtain a hygroscopic homogeneous salt mixture, wherein the hygroscopic homogeneous salt mixture has a melting temperature in the range of 100 to 150° C.

In one implementation, the method for preparation of hygroscopic homogeneous salt mixture includes the steps of: (a) contacting 60 to 70 wt % potassium nitrate and 5 to 20 wt % lithium nitrate with 10 to 35 wt % of a metal salt having water of crystallization to form a heterogeneous mixture; (b) subjecting said heterogeneous mixture to a temperature of 140 to 180° C. in a pressure tube for 0.5 to 1.5 h to obtain a homogeneous mixture; and (c) removing water from the homogeneous mixture to obtain a hygroscopic homogeneous salt mixture.

In one implementation, the method for preparation of hygroscopic homogeneous salt mixture includes the steps of: (a) contacting 60 to 70 wt % potassium nitrate and 5 to 20 wt % lithium nitrate with 10 to 35 wt % of a metal salt having water of crystallization to form a heterogeneous mixture, wherein potassium nitrate and lithium nitrate are dried at a temperature in the range of 80 to 120° C. under reduced pressure before carrying out step (a); (b) subjecting said heterogeneous mixture to a temperature of 140 to 180° C. in a pressure tube for 0.5 to 1.5 h to obtain a homogeneous mixture; and (c) removing water from the homogeneous mixture to obtain a hygroscopic homogeneous salt mixture.

In one implementation, the method for preparation of hygroscopic homogeneous salt mixture includes the steps of: (a) contacting 60 to 70 wt % potassium nitrate and 5 to 20 wt % lithium nitrate with 10 to 35 wt % of a metal salt having water of crystallization selected from the group consisting of alkali metal salt, alkaline earth metal salt, and transitional metal salt to form a heterogeneous mixture, wherein potassium nitrate and lithium nitrate are dried at a temperature in the range of 80 to 120° C. under reduced pressure before carrying out step (a); (b) subjecting said heterogeneous mixture to a temperature of 140 to 180° C. in a pressure tube for 0.5 to 1.5 h to obtain a homogeneous mixture; and (c) removing water from the homogeneous mixture to obtain a hygroscopic homogeneous salt mixture.

In one implementation, the method for preparation of hygroscopic homogeneous salt mixture includes the steps of: (a) contacting 60 to 70 wt % potassium nitrate and 5 to 20 wt % lithium nitrate with 10 to 35 wt % of a metal salt having water of crystallization selected from the group consisting of alkali metal salt, alkaline earth metal salt, and transitional metal salt with a melting point in the range 40 to 120° C. to form a heterogeneous mixture, wherein potassium nitrate and lithium nitrate are dried at a temperature in the range of 80 to 120° C. under reduced pressure before carrying out step (a); (b) subjecting said heterogeneous mixture to a temperature of 140 to 180° C. in a pressure tube for 0.5 to 1.5 h to obtain a homogeneous mixture; and (c) removing water from the homogeneous mixture to obtain a hygroscopic homogeneous salt mixture.

In one implementation, the method for preparation of hygroscopic homogeneous salt mixture includes the steps of: (a) contacting 60 to 70 wt % potassium nitrate and 5 to 20 wt % lithium nitrate with 10 to 35 wt % of a metal salt having water of crystallization selected from the group consisting of alkali metal salt, alkaline earth metal salt, and transitional metal salt with a melting point in the range 40 to 80° C. to form a heterogeneous mixture, wherein potassium nitrate and lithium nitrate are dried at a temperature in the range of 80 to 120° C. under reduced pressure before carrying out step (a); (b) subjecting said heterogeneous mixture to a temperature of 140 to 180° C. in a pressure tube for 0.5 to 1.5 h to obtain a homogeneous mixture; and (c) removing water from the homogeneous mixture to obtain a hygroscopic homogeneous salt mixture.

In one implementation, the method for preparation of hygroscopic homogeneous salt mixture includes the steps of: (a) contacting 60 to 70 wt % potassium nitrate and 5 to 20 wt % lithium nitrate with 10 to 35 wt % of a metal salt having water of crystallization selected from the group consisting of alkali metal salt, alkaline earth metal salt, and transitional metal salt with a melting point in the range 40 to 80° C. to form a heterogeneous mixture, wherein potassium nitrate and lithium nitrate are dried at a temperature in the range of 80 to 120° C. under reduced pressure before carrying out step (a), wherein the heterogeneous mixture has moisture content in the range 3 to 13 wt %; (b) subjecting said heterogeneous mixture to a temperature of 140 to 180°

C. in a pressure tube for 0.5 to 1.5 h to obtain a homogeneous mixture; and (c) removing water from the homogeneous mixture to obtain a hygroscopic homogeneous salt mixture.

In one implementation, the method for preparation of hygroscopic homogeneous salt mixture includes the steps of: (a) contacting 60 to 70 wt % potassium nitrate and 5 to 20 wt % lithium nitrate with 10 to 35 wt % of a metal salt having water of crystallization selected from the group consisting of alkali metal salt, alkaline earth metal salt, and transitional metal salt with a melting point in the range 40 to 80° C. to form a heterogeneous mixture, wherein potassium nitrate and lithium nitrate are dried at a temperature in the range of 80 to 120° C. under reduced pressure before carrying out step (a), wherein the heterogeneous mixture has moisture content in the range 3 to 13 wt %; (b) subjecting said heterogeneous mixture to a temperature of 140 to 180° C. in a pressure tube for 0.5 to 1.5 h at a pressure in the range of 1.3 to 3 bars to obtain a homogeneous mixture; and (c) removing water from the homogeneous mixture to obtain a hygroscopic homogeneous salt mixture.

In one implementation, the method for preparation of hygroscopic homogeneous salt mixture includes the steps of: (a) contacting 60 to 70 wt % potassium nitrate and 5 to 20 wt % lithium nitrate with 10 to 35 wt % of a metal salt having water of crystallization selected from the group consisting of alkali metal salt, alkaline earth metal salt, and transitional metal salt with a melting point in the range 40 to 80° C. to form a heterogeneous mixture, wherein potassium nitrate and lithium nitrate are dried at a temperature in the range of 80 to 120° C. under reduced pressure before carrying out step (a), wherein the heterogeneous mixture has moisture content in the range 3 to 13 wt %; (b) subjecting said heterogeneous mixture to a temperature of 140 to 180° C. in a pressure tube for 0.5 to 1.5 h at a pressure in the range of 1.3 to 3 bars to obtain a homogeneous mixture; and (c) removing water from the homogeneous mixture to obtain a hygroscopic homogeneous salt mixture, wherein the hygroscopic homogeneous salt mixture has a melting temperature in the range of 100 to 150° C.

In one implementation, the method for preparation of hygroscopic homogeneous salt mixture includes the steps of: (a) contacting 60 to 70 wt % potassium nitrate and 5 to 20 wt % lithium nitrate with 10 to 35 wt % of a metal salt having water of crystallization selected from the group consisting of sodium thiosulphate, calcium nitrate, aluminium nitrate, iron nitrate, nickel nitrate, and cobalt nitrate with a melting point in the range 40 to 80° C. to form a heterogeneous mixture, wherein potassium nitrate and lithium nitrate are dried at a temperature in the range of 80 to 120° C. under reduced pressure before carrying out step (a), wherein the heterogeneous mixture has moisture content in the range 3 to 13 wt %; (b) subjecting said heterogeneous mixture to a temperature of 140 to 180° C. in a pressure tube for 0.5 to 1.5 h at a pressure in the range of 1.3 to 3 bars to obtain a homogeneous mixture; and (c) removing water from the homogeneous mixture to obtain a hygroscopic homogeneous salt mixture, wherein the hygroscopic homogeneous salt mixture has a melting temperature in the range of 100 to 150° C.

EXAMPLES

The disclosure will now be illustrated with working examples, which is intended to illustrate the working of disclosure and not intended to take restrictively to imply any limitations on the scope of the present disclosure. Other examples are also possible which are within the scope of the present disclosure.

The melting points and enthalpies of fusion of molten salts were measured using differential scanning calorimetry (DSC). Mass changes with respect to temperature in different gas atmospheres were measured using thermogravimetric analysis (TGA). Both DSC and TGA were determined simultaneously using NETZCH Simultaneous Thermal Analyzer STA 449 F3 Jupiter. The TGA-DSC analysis has been determined both in nitrogen atmosphere as well as air atmosphere.

Specific heat capacity was measured using DSC technique. For specific heat measurements three measurements have been done; first a correction run using empty crucibles, second using the first correction run, done the measurement using sapphire disc as standard, third the DSC measurement using the sample. Finally, after the three measurements, the specific heat capacities of samples with respect to temperature have been measured using ratio method.

Dynamic viscosity measurements have been carried out using Anton Paar Dynamic Shear Rheometer MCR 502. The salt was taken in a cell made up of non-corrosive Inconel and the temperature is increased to melt the sample and simultaneously measured the dynamic viscosity at various sheer rate and constant temperature and also dynamic viscosity at various temperature at constant sheer rate.

Thermal conductivity was determined by using transient plane source method and the instrument used was HOT-DISK TPS 2500 S thermal conductivity meter. The molten salt powder was put in a small metal cup (made up of non-corrosive Inconel) and placed with the HOT DISK sensor, named 5465 (radius 3.189 mm) in the furnace. The furnace was put on end, so that the furnace tube is vertical, not horizontal as commonly used. This way the sample could melt to liquid and still stay within the cup. The closed furnace was evacuated and filled with $N_2$ to protect from any air or moisture.

The temperature was then raised to 250° C., kept stable for a while, so that all materials melt. Then during the natural cooling of the furnace, when target temperature was set to RT, one reading at each 30 min interval was taken. This gave a series of measurements from 245° C. to 32° C. Each measurement was evaluated with temperature drift compensation, but since the cooling rate was so slow and steadily progressing, it did not cause any noise in the results. Thermal conductivities of HPHTF-A, HPHTF-B and HPHTF-C at 200° C. are 0.5063, 0.5696 and 0.5701 W/mK respectively.

Example 1

Synthesis of Hygroscopic Homogeneous Salt Mixture

Metals salts, such as $KNO_3$, (60 to 70 Wt %), $LiNO_3$ (5 to 20 Wt %), and the hydrated salt (10 to 30 Wt %) were weighed according to the composition provided in Table 1 and mixed in a pressure tube with magnetic pellet to form a heterogeneous mixture. Before weighing, two salts viz. $KNO_3$ and $LiNO_3$ are dried at 100° C. in vacuum to keep the moisture content of those salts as minimum as possible. The pressure tube was tightened with Teflon screw, and heated at 100 to 150° C. and stirred using a magnetic stirrer associated with in-built oil bath. After evolution of hydrated water, under pressure inside the pressure tube the solution is thoroughly mixed and kept at 150° C. for 1.5 h and then the pressure was released by opening the tube and water removed using rotary evaporator. So the determining factor is the homogenization inside the closed pressure vessel for 1.5 h. The pressure inside the tube was measured using pressure gauge found to be in the range of 1.2 to 3 bar. The melting points of the hygroscopic homogeneous salt mixture are provided in Table 1 and are below 150° C. The water content of the whole mixture can be calculated using TGA analysis. The moisture content of the heterogeneous mixture was found to be in the range of 3 to 13 wt %.

TABLE 1

Hygroscopic homogenous salt mixture

| Materials | Salts in pressure tube | Wt ratio of salts | Melting point of Molten Salt |
|---|---|---|---|
| HPHTF-A | $KNO_3:Ca(NO_3)_2 \cdot 4H_2O:LiNO3$ | 67:19:14 | 137 |
| HPHTF-B | $KNO_3:Ca(NO_3)_2 \cdot 4H_2O:LiNO3$ | 66.5:23:10.5 | 136.2 |
| HPHTF-C | $KNO_3:Ca(NO_3)_2 \cdot 4H_2O:LiNO3$ | 65:25:10 | 137.9 |
| HPHTF-A1 | $KNO_3:Na_2S_2O_3 \cdot 5H_2O:LiNO3$ | 66.2:20:13.8 | 135.7 |
| HPHTF-B1 | $KNO_3:Na_2S_2O_3 \cdot 5H_2O:LiNO3$ | 65.8:22:12.2 | 128.5 |
| HPHTF-C1 | $KNO_3:Na_2S_2O_3 \cdot 5H_2O:LiNO3$ | 65:23:12 | 133.6 |
| HPHTF-A2 | $KNO_3:Al(NO_3)_3 \cdot 9H_2O:LiNO3$ | 61:29:10 | 135.8 |
| HPHTF-B2 | $KNO_3:Al(NO_3)_3 \cdot 9H_2O:LiNO3$ | 60:28:12 | 135 |
| HPHTF-C2 | $KNO_3:Al(NO_3)_3 \cdot 9H_2O:LiNO3$ | 60.5:30:9.5 | 130 |
| HPHTF-A3 | $KNO_3:Fe(NO_3)_3 \cdot 9H_2O:LiNO3$ | 63.5:30:6.5 | 140 |
| HPHTF-B3 | $KNO_3:Fe(NO_3)_3 \cdot 9H_2O:LiNO3$ | 62:29:9 | 135 |
| HPHTF-C3 | $KNO_3:Fe(NO_3)_3 \cdot 9H_2O:LiNO3$ | 61:29:10 | 132 |
| HPHTF-A4 | $KNO_3:Ni(NO_3)_2 \cdot 6H_2O:LiNO3$ | 67.5:18.5:14 | 137 |
| HPHTF-B4 | $KNO_3:Ni(NO_3)_2 \cdot 6H_2O:LiNO3$ | 67:19:14 | 128 |
| HPHTF-C4 | $KNO_3:Ni(NO_3)_2 \cdot 6H_2O:LiNO3$ | 66:24:10 | 129 |
| HPHTF-A5 | $KNO_3:Co(NO_3)_2 \cdot 6H_2O:LiNO3$ | 63:30:7 | 136 |
| HPHTF-B5 | $KNO_3:Co(NO_3)_2 \cdot 6H_2O:LiNO3$ | 62:29:9 | 130 |
| HPHTF-C5 | $KNO_3:Co(NO_3)_2 \cdot 6H_2O:LiNO3$ | 60.5:26:13.5 | 125 |

FIG. 1 describes TGA-DTG of HPHTF-A, HPHTF-B and HPHTF-C under nitrogen atmosphere. Aforesaid samples were heated from RT to 1000° C. at a heating rate of 10° C./min, nitrogen purge flow is 80 mL/min. Initial weight loss is due to loss of water and the mixtures are stable up to 600° C. DTG shows the rate of change of weight loss. The maximum weight loss are at 679.3, 651.8 and 679.2° C. for HPHTF-A, HPTF-B and HPHTF-C respectively.

Figure 2:
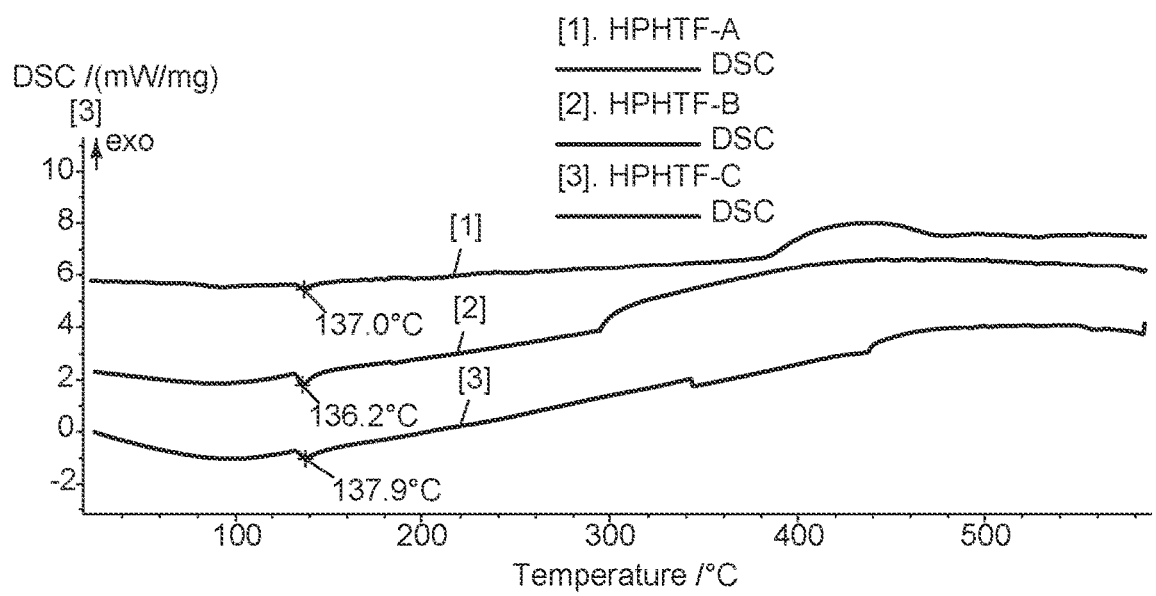
FIG. 2 illustrates DSC of HPHTF-A, HPHTF-B and HPHTF-C.

FIG. 2 shows the DSC of HPHTF-A, HPHTF-B and HPHTF-C under nitrogen atmosphere. Aforesaid samples were heated from RT to 1000° C. at a heating rate of 10° C./min, Nitrogen purge flow is 80 mL/min. Endothermic peaks at 137, 136.2 and 137.9° C. are the melting points of HPHTF-A, HPHTF-B and HPHTF-C respectively.

Figure 3:
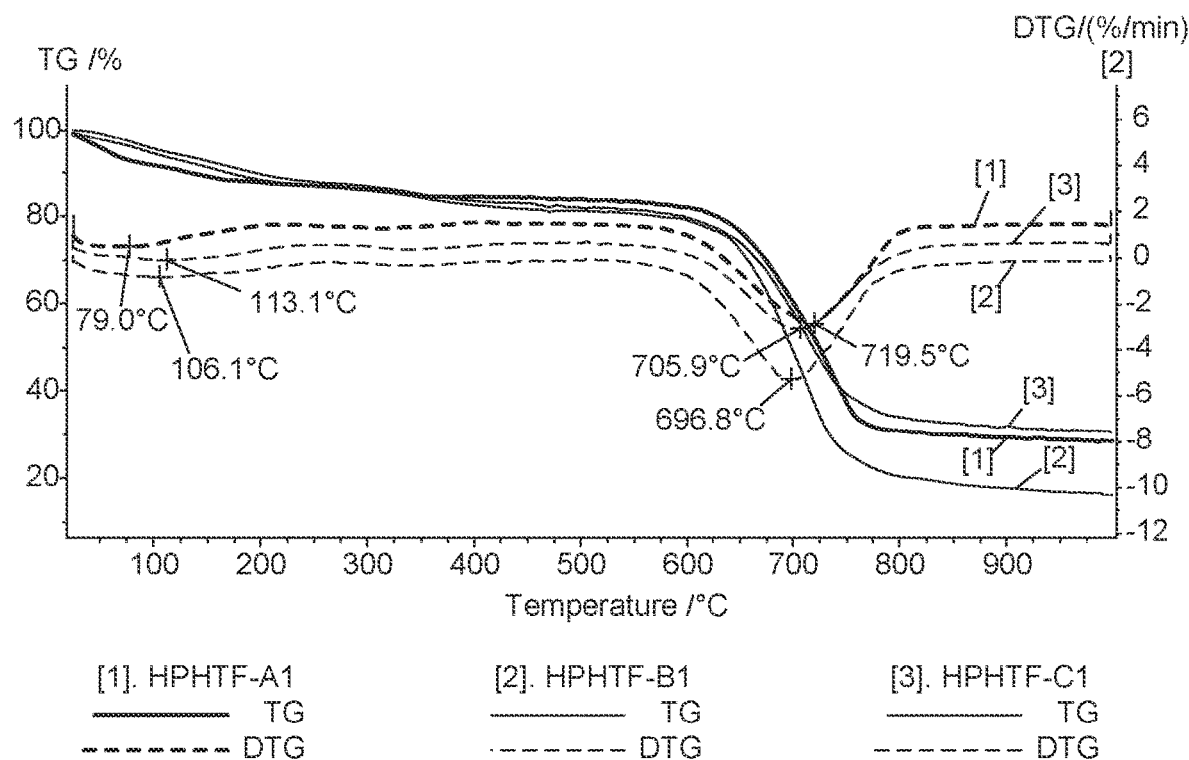
FIG. 3 illustrates TGA of HPHTF-A1, HPHTF-B1 and HPHTF-C1.

FIG. 3 exhibits the TGA of HPHTF-A1, HPHTF-B1 and HPHTF-C1 under nitrogen atmosphere. Aforesaid samples were heated from RT to 1000° C. at a heating rate of 10° C./min, Nitrogen purge flow is 80 mL/min. Initial weight loss is due to loss of water and the mixtures are stable up to 600° C. DTG shows the rate of change of weight loss. The maximum weight loss are at 705.9, 696.8 and 719.5° C. for HPHTF-A1, HPTF-B1 and HPHTF-C1 respectively.

Figure 4:
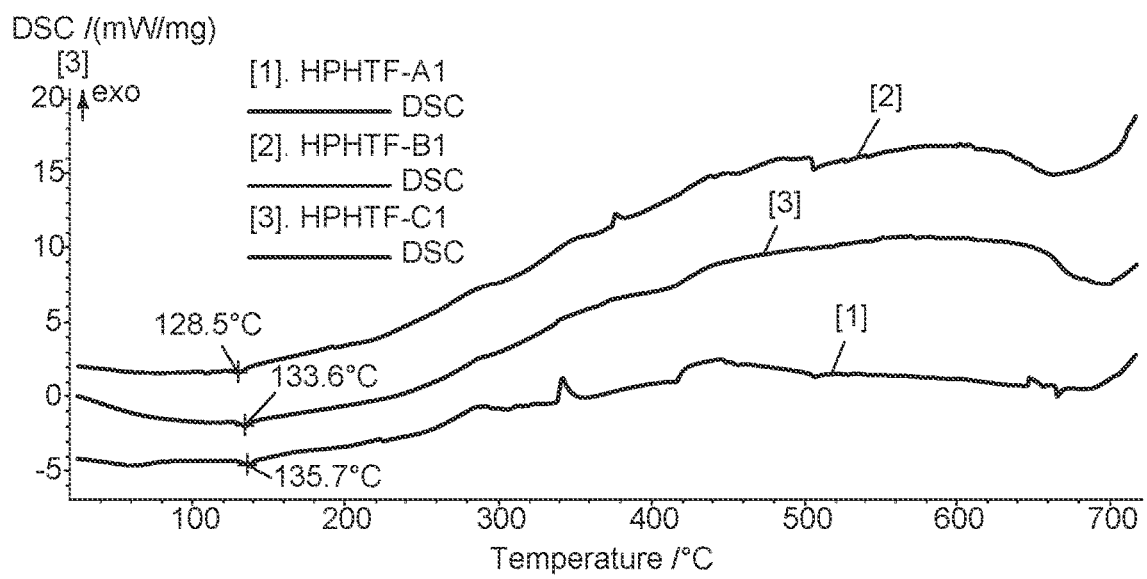
FIG. 4 illustrates DSC of HPHTF-A1, HPHTF-B1 and HPHTF-C1.

FIG. 4 exhibits the DSC of HPHTF-A1, HPHTF-B1 and HPHTF-C1 in Nitrogen atmosphere. Aforesaid samples were heated from RT to 1000° C. at a heating rate of 10° C./min, Nitrogen purge flow is 80 mL/min. Endothermic peaks at 135.7, 128.5 and 133.6° C. are the melting points of HPHTF-A1, HPHTF-B1 and HPHTF-C1 respectively.

Figure 5:
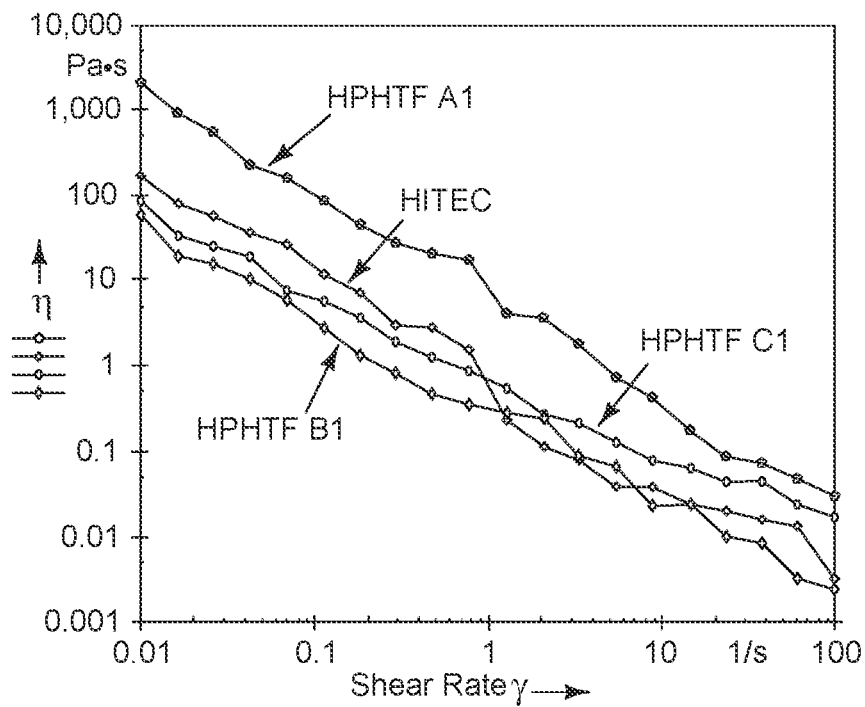
FIG. 5 illustrates rheological behaviour of HPHTF-A1, HPHTF-B1 and HPHTF-C1 compared to commercial reference sample.

FIG. 5 shows the rheological behaviour of HPHTF-A1, HPHTF-B1 and HPHTF-C1 compared to commercial reference sample (HITEC salt HITEC, a mixture of 53% $KNO_3$, 7% $NaNO_3$ and 40% $NaNO_2$, was prepared according to description provided for its preparation in U.S. Pat. No. 7,588,694). Complex viscosity (TO) vs sheer rate (y). Viscoelastic properties of HPHTF-A1 is slightly different from that of HITEC, however, the viscoelastic properties of HPHTF-B1 and HPHTF-C1 are comparable with HITEC. Sheer thinning behavior of non-Newtonian liquid is observed and viscosity reduction with increased sheer rate similar to commercial HITEC salt.

Table 2 provides the characteristics of hygroscopic homogeneous salt mixtures of example

TABLE 2

| | Molten Salt features | | | | | |
|---|---|---|---|---|---|---|
| Materials | Melting Point (° C.) | Enthalpy (J/g) | Thermal Stability (° C.) | Cp (kJ/kgK) @ RT | Cp (kJ/kgK) @ 200° C. | Cp (kJ/kgK) @ 300° C. |
| HPHTF-A | 137 | 4.711 | ~550 | 1.761 | 1.644 | 2.084 |
| HPHTF-B | 136.2 | 12.030 | ~550 | 1.779 | 1.193 | 1.504 |
| HPHTF-C | 137.9 | 9.103 | ~550 | 1.811 | 2.530 | 1.373 |
| HPHTF-A1 | 135.7 | 8.018 | ~550 | 1.303 | 1.2 | 1.017 |
| HPHTF-B1 | 128.5 | 3.776 | ~550 | 1.4 | 2.14 | 1.58 |
| HPHTF-C1 | 133.6 | 12.900 | ~550 | 2.282 | 2.361 | 1.554 |
| HPHTF-A2 | 135.8 | 15.4 | 600 | 2.391 | 1.526 | 1.53 |
| HPHTF-B2 | 135 | 14.8 | ~550 | 1.581 | 1.373 | 1.27 |
| HPHTF-C2 | 130 | 13.17 | ~550 | 1.351 | 1.421 | 1.411 |

Table 2 shows the melting point, enthalpy of fusion, thermal stability and specific heat capacity. Specific heat capacity is measured at room temperature, at 200° C. and at 300° C. Melting point of HPHTF-A, HPHTF-B and HPHTF-C is 137, 136.2 and 137.9° C. and the enthalpy of fusion is 4.711, 12.03, 9.103 respectively. The salts were found to be thermally stable and can be used safely around 550° C. without any degradation. The specific heat capacity values of HPHTF-A are 1.761, 1.644 and 2.084 kJ/kgK at room temperature (RT), at 200° C., and at 300° C. respectively. The Cp values of HPHTF-B are 1.779, 1.193, and 1.504 at RT, at 200° C., and at 300° C. respectively.

The Cp values of HPHTF-C are 1.811, 2.530, and 1.373 at RT, at 200° C., and at 300° C. respectively. Similarly the corresponding data of HPHTF-A1, HPHTF-B1, HPHTF-C1, HPHTF-A2, HPHTF-B2, and HPHTF-C2 are also given in Table 2. All these Cp values suggested that these salts can be used as efficient solar thermal energy storage material. The ideal value of molten salt based heat storage/heat transfer fluids are >1.2 kJ/kgK and the commercially available HITEC salt exhibit a Cp of around 1.5 kJ/kgK at 200° C.

Comparative Example 1

Open System Experiment

Figure 6:
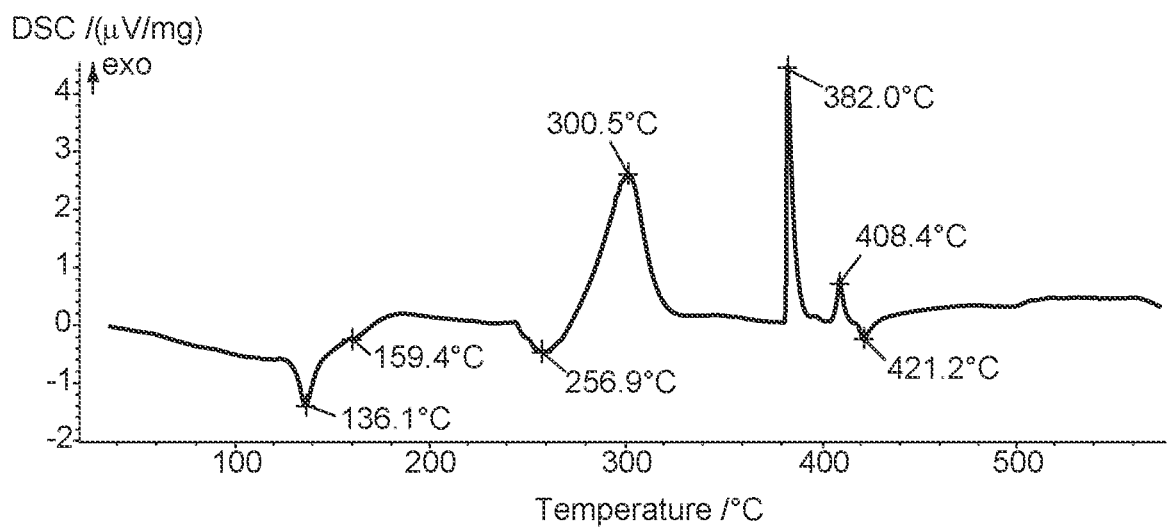
FIG. 6 illustrates DSC of non-homogenized HPHTF-A.

Molten salt mixture containing 67 g of $KNO_3$, 19 g of $Ca(NO_3)_2.4H_2O$ and 14 g of $LiNO_3$ was taken in a 100 mL open glass container, stirred and heated to 180° C. for 12 h. The aforesaid procedure is repeated using stainless steel container. The mixture was characterized with DSC. FIG. 6 exhibits DSC curve with multiple phase transitions suggesting non-homogenized HPHTF-A.

Comparative Example 2

Open System Experiment

Figure 7:
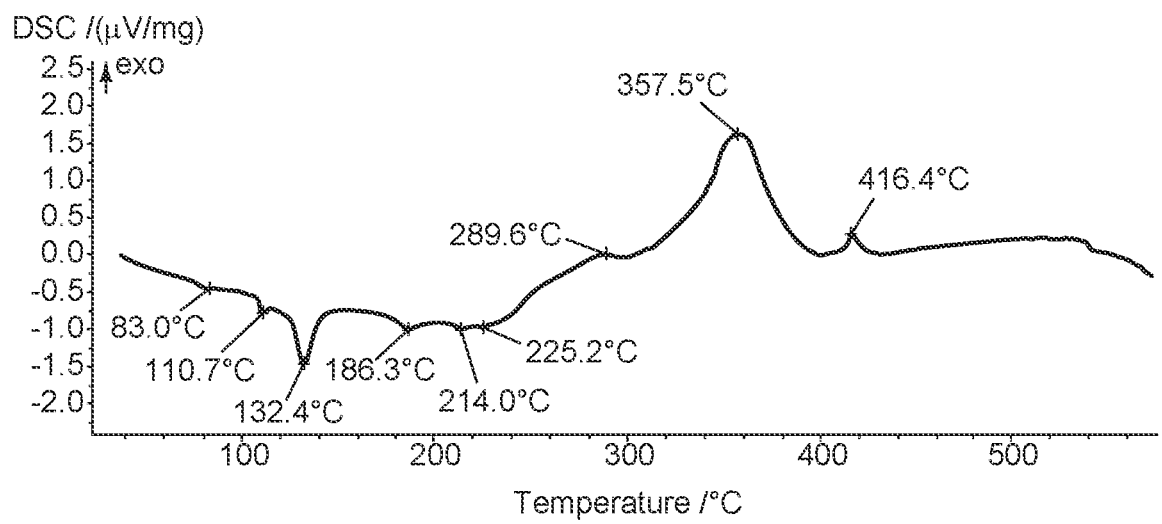
FIG. 7 illustrates DSC of non-homogenized HPHTF-B.

Molten salt mixture containing 66.5 g of $KNO_3$, 23 g of $Ca(NO_3)_2.4H_2O$ and 10.5 g of $LiNO_3$ was taken in a 100 mL glass open container, stirred and heated to 150° C. for 24 h. The mixture was characterized with DSC (FIG. 7). The DSC curve showed multiple phase transitions suggestive of non-homogenized HPHTF-B.

Comparative Example 3

Closed System and Excess Water Experiment

Figure 8:
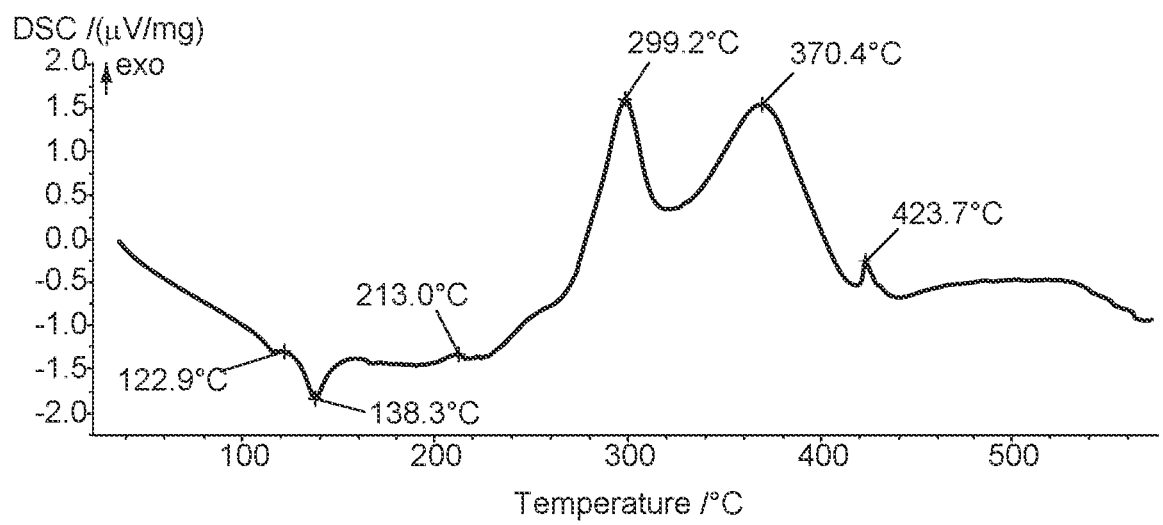
FIG. 8 illustrates DSC of non-homogenized HPHTF-B.

Molten salt mixture containing 66.5 g of $KNO_3$, 23 g of $Ca(NO_3)_2.4H_2O$ and 10.5 g of $LiNO_3$ and 10 mL water was taken in a 100 mL glass pressure tube, stirred and heated to 150° C. for 6 h. Water was removed using rotary evaporator at reduced pressure. The mixture was characterized with DSC (FIG. 8). The DSC curve showed multiple phase transitions suggestive of non-homogenized HPHTF-B.

Comparative Example 4

Closed System and Temperature Below 150° C.

Figure 9:
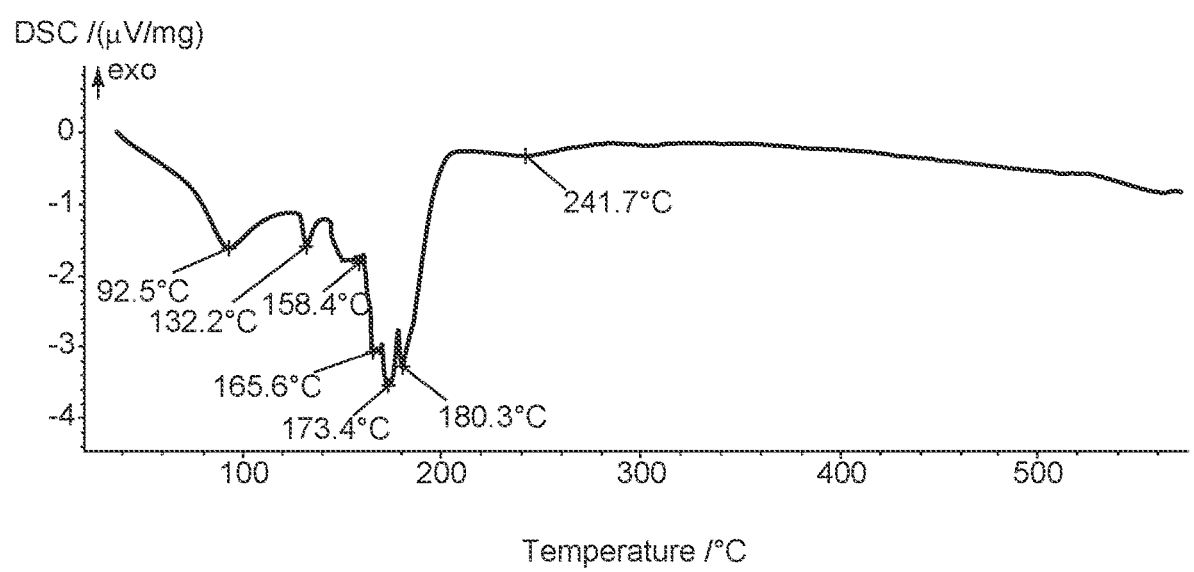
FIG. 9 illustrates DSC of non-homogenized HPHTF-C.

Salt mixture containing 65 g of $KNO_3$, 25 g of $Ca(NO_3)_2.4H_2O$ and 10 g of $LiNO_3$ was taken in a 100 mL glass pressure tube, stirred and heated to 130° C. for 12 h. Water was removed using rotary evaporator at reduced pressure. The mixture was characterized with DSC (FIG. 9). The DSC curve showed multiple phase transitions suggestive of non-homogenized HPHTF-C.

Surprisingly, homogenization was not effective for processes carried out in open systems even at higher temperature. Further external addition of water resulted in non-homogeneous mixtures.

Individual salts were obtained from commercial sources and have been used without any further purification. Molten salts are good thermal storage materials due to its latent heat storage during phase change as well as better specific heat capacity. Thermal conductivity test is conducted using thermal conductivity analyser and found that the results are promising towards the generation of electricity from solar thermal power in a cost-effective manner Advantages Gained in the Example Illustrative Process in this Subject Matter:

The hygroscopic homogeneous salt mixture described herein can provide a cost-effective way to make thermal storage as well as heat transfer materials. These materials also can be applied in solar thermal power plants which in turn will reduce the levelized cost of electricity (LCOE). Complete homogenization of molten salt mixture is necessary to utilize it for thermal energy storage. For example, in a solar thermal power plant, the molten salt has to be melted in a melt tank prior to its circulation through the solar collector field where the solar thermal energy is stored and heat exchanger where the heat gets transferred to water to make steam to generate electricity. If the material is non-homogenized, it will be having multiple melting points and the melting temperature cannot be judged. This will make problem to design melt tank and the whole molten salt based energy storage system.

Further, highly hygroscopic nature of homogeneous salt mixture help to clean the molten salt loop with water as they are more readily soluble in water compared to commercial available HITEC salts. Transient plane source sensors used for measuring thermal conductivity of molten salts in the molten state can be cleaned easily in the case of hygroscopic molten salts while the less hygroscopic commercial salts like HITEC will stick on the sensor and has to be soaked in water for long time in order to clean it and extra care should be taken to protect the sensor from damage. Molten salt loop is an integral part of concentrated solar thermal (CSP) power plant. Regular monitoring should be conducted to check the degradation of molten salt after several cycles of operation. Once the degradation or change in thermo-physical properties of circulating molten salt is detected the salt has to be replaced. For that the whole loop has to be thoroughly washed and cleaned. Even though all salts are water soluble, cleaning of more hygroscopic salt is easy compared to less hygroscopic salt.

For example, in the case of thermal conductivity analysis of molten salts, the sensor had to be immersed in the melted salt. After the measurement the sensor was cleaned. It was observed that the cleaning of more hygroscopic salt is easier than less hygroscopic salt using water.

Although the subject matter has been described in considerable detail with reference to certain examples and implementations thereof, other implementations are possible. As such, the spirit and scope of the appended claims should not be limited to the description of the preferred examples and implementations contained therein.

We claim:

1. A method for preparation of hygroscopic homogeneous salt mixture, the method comprising:
    a) contacting at least one alkali metal salt with a metal salt having water of crystallization to form a heterogeneous mixture;
    b) subjecting said heterogeneous mixture to a temperature of 140 to 180° C. in a closed system to obtain a homogeneous mixture; and
    c) opening the closed system and removing water from the homogeneous mixture to obtain a hygroscopic homogeneous salt mixture comprising the at least one alkali metal salt and the metal salt having water of crystallization.

2. The method as claimed in claim 1, wherein the at least one alkali metal salt is selected from the group consisting of lithium salt of inorganic anions, sodium salt of inorganic anions, potassium salt of inorganic anions, and combinations thereof.

3. The method as claimed in claim 1, wherein the at least one alkali metal salt is selected from the group consisting of lithium metal salt, potassium metal salt, and combinations thereof.

4. The method as claimed in claim 1, wherein the at least one alkali metal salt weight ratio in the heterogeneous mixture is in the range of 65 to 90%.

5. The method as claimed in claim 1, wherein the at least one alkali metal salt is a combination of lithium and potassium nitrate.

6. The method as claimed in claim 5, wherein potassium nitrate weight ratio in the heterogeneous mixture is in the range of 60 to 70% and lithium nitrate weight ratio in the heterogeneous mixture is in the range of 5 to 20%.

7. The method as claimed in claim 1, wherein the at least one alkali metal salt is dried at a temperature in the range of 80 to 120° C. under reduced pressure before carrying out the contacting at least one alkali metal salt with the metal salt having water of crystallization to form the heterogeneous mixture.

8. The method as claimed in claim 1, wherein the metal salt having water of crystallization is selected from the group consisting of alkali metal salt, alkaline earth metal salt, and transitional metal salt.

9. The method as claimed in claim 1, wherein the metal salt having water of crystallization has melting point in the range 40 to 120° C.

10. The method as claimed in claim 1, wherein the metal salt having water of crystallization has melting point in the range 40 to 80° C.

11. The method as claimed in claim 1, wherein the metal salt having water of crystallization weight ratio in the heterogeneous mixture is in the range of 10 to 35%.

12. The method as claimed in claim 1, wherein the heterogeneous mixture has moisture content in the range 3 to 13 wt %.

13. The method as claimed in claim 1, wherein the heterogeneous mixture is subjected to a temperature of 140 to 180° C. for 0.5 to 1.5 h.

14. The method as claimed in claim 1, wherein the heterogeneous mixture is subjected to a temperature of 140 to 180° C. at a pressure in the range of 1.3 to 3 bars.

15. The method as claimed in claim 1, wherein the hygroscopic homogeneous salt mixture has a melting temperature in the range of 100 to 150° C.

16. A method for preparation of hygroscopic homogeneous salt mixture, the method comprising:
 a) contacting 60 to 70 wt % potassium nitrate and 5 to 20 wt % lithium nitrate with 10 to 35 wt % of a metal salt having water of crystallization to form a heterogeneous mixture;
 b) subjecting said heterogeneous mixture to a temperature of 140 to 180° C. in a closed pressure tube for 0.5 to 1.5 h to obtain a homogeneous mixture; and
 c) opening the closed pressure tube and removing water from the homogeneous mixture to obtain a hygroscopic homogeneous salt mixture comprising the potassium nitrate, the lithium nitrate, and the metal salt having water of crystallization with a melting temperature in the range of 100 to 150° C.

17. The method of claim 1 wherein the metal salt having water of crystallization is $Ca(NO_3)_2.4H_2O$, $Na_2S_2O_3.5H_2O$, $Al(NO_3)_3.9H_2O$, $Ni(NO_3)_2.6H_2O$, $Co(NO_3)_2.6H_2O$, or a combination thereof.

* * * * *